(12) United States Patent  (10) Patent No.: US 7,537,644 B2
Park et al.  (45) Date of Patent: May 26, 2009

(54) METHOD FOR DEGASSING A LIQUID

(75) Inventors: Jonathan Park, Chardon, OH (US);
Nelson Gardner, Largo, FL (US)

(73) Assignee: GasTran Systems, Cleveland, OH (US)

( * ) Notice: Subject to any disclaimer, the term of this patent is extended or adjusted under 35 U.S.C. 154(b) by 0 days.

(21) Appl. No.: 11/824,064

(22) Filed: Jun. 29, 2007

(65) Prior Publication Data

US 2007/0295662 A1    Dec. 27, 2007

Related U.S. Application Data

(63) Continuation-in-part of application No. 11/541,766, filed on Oct. 2, 2006, which is a continuation-in-part of application No. 10/971,385, filed on Oct. 22, 2004, now Pat. No. 7,326,283.

(60) Provisional application No. 60/514,213, filed on Oct. 24, 2003.

(51) Int. Cl.
*B01D 19/00* (2006.01)
(52) U.S. Cl. .......................................... 95/261; 96/216
(58) Field of Classification Search .................. 95/261, 95/266, 248; 96/216, 217, 214
See application file for complete search history.

(56) References Cited

U.S. PATENT DOCUMENTS

| 2,941,872 | A | 6/1960 | Pilo et al. |
| 4,112,828 | A | 9/1978 | Mojonnier et al. |
| 4,197,063 | A | 4/1980 | Davidson |
| 4,356,133 | A | 10/1982 | Cowen et al. |
| 4,908,048 | A | 3/1990 | Hofmann et al. |
| 5,000,766 | A | 3/1991 | Yano et al. |

(Continued)

FOREIGN PATENT DOCUMENTS

EP    0 089 128 A1 *  9/1983

(Continued)

OTHER PUBLICATIONS

Bucklin, R. et al., "Higee Contactors for Selective $H_2S$ Removal and Superdehydration", *1987 Gas Conditioning Conference*, pp. 1-16.

(Continued)

*Primary Examiner*—Duane S Smith
*Assistant Examiner*—Douglas J Theisen
(74) *Attorney, Agent, or Firm*—Tarolli, Sundheim, Covell & Tummino LLP

(57) ABSTRACT

A method is provided for degassing a liquid. One step of the method includes providing a rotating packed bed (RPB) reactor. The RPB reactor includes a rotatable permeable element disposed within a chamber defining an interior region, at least one liquid inlet for infusing the liquid into the interior region, at least one gas outlet for removing a gas from the interior region, and at least one liquid outlet for removing a liquid from the interior region. The rotatable permeable element within the RPB reactor is caused to spin at a tangential velocity, and the liquid is then infused into the at least one liquid inlet at an inlet flow rate. Next, a vacuum is applied to the interior region of the RPB reactor via the at least one gas outlet to generate a liquid substantially free of the gas.

19 Claims, 3 Drawing Sheets

U.S. PATENT DOCUMENTS

| | | | |
|---|---|---|---|
| 5,190,515 | A | 3/1993 | Eaton et al. |
| 5,277,691 | A | 1/1994 | Eaton et al. |
| 5,686,051 | A | 11/1997 | Shiota et al. |
| 5,861,052 | A | 1/1999 | Meinander |
| 5,951,921 | A | 9/1999 | Koganezawa et al. |
| 5,971,368 | A | 10/1999 | Nelson et al. |
| 5,993,518 | A | 11/1999 | Tateyama |
| 6,062,546 | A | 5/2000 | Gudmundsson |
| 6,076,808 | A | 6/2000 | Porter |
| 6,629,821 | B1 | 10/2003 | Yokota et al. |
| 6,808,637 | B2 | 10/2004 | Cho |
| 6,827,916 | B2 | 12/2004 | Guo et al. |
| 6,884,401 | B2 | 4/2005 | Yang et al. |
| 2004/0015003 | A1* | 1/2004 | Yang et al. .................. 558/207 |
| 2005/0022666 | A1 | 2/2005 | Liu et al. |
| 2005/0116364 | A1 | 6/2005 | Gardner et al. |
| 2005/0178733 | A1 | 8/2005 | Conger et al. |
| 2006/0120858 | A1 | 6/2006 | Taylor |
| 2006/0151896 | A1 | 7/2006 | Wang |
| 2007/0025180 | A1 | 2/2007 | Ishii |

FOREIGN PATENT DOCUMENTS

WO    WO 2006/010109 A2    1/2006

OTHER PUBLICATIONS

Burns, J., et al., "Process Intensification: Operating Characteristics of Rotating Packed Beds—Determination of Liquid Hold-Up for a High-Voidage Structured Packing", *Chemical Engineering Science*, vol. 55, Issue 13, Jul. 2000, pp. 2401-2415.

Chandra, A. et al., "Characteristics of Flow in a Rotating Packed Bed (HIGEE) with Split Packing", *Ind. Eng. Chem. Res.* 2005, vol. 44, Issue 11, pp. 4051-4060.

Chen, J. et al. "Synthesis of Nano-Particles of $CaCO_3$ in a Novel Reactor", *Process Intensification*, 1997, pp. 157-164.

Chen, Y., et al., "Absorption of VOCs in a Rotating Packed Bed", *Ind. Eng. Chem. Res.* 2002, pp. 1583-1588.

Chen, Y. et al., "Micromixing in a Rotating Packed Bed", *J. Chem. Eng. of Japan*, 2004, vol. 37, Issue 9, pp. 1122-1128.

Chen et al. "Modeling Ozone Contacting Process in a Rotating Packed Bed", *Ind. Eng. Chem. Res.*, 2004, 43:228-236.

Cummings, C. et al., "Polymer Devolatilization and Pelletization in a Rotating Packed Bed", *Process Intensification*, 1999, pp. 147-158.

Dhiman, S. et al., "Process Intensification in a Trickle-Bed Reactor: Experimental Studies", *AIChE Journal*, 2005, vol. 51, Issue 12, pp. 3186-3192.

Guo, F. et al., "Hydrodynamics and Mass Transfer in Cross-Flow Rotating Packed Bed", *Chem. Eng. Sci.*, 1997, vol. 52, Nos. 21/22, pp. 3853-3859.

Lin, C. et al., "Distillation in a Rotating Packed Bed", *J. Chem. Eng. of Japan*, 2002, vol. 35, No. 12, pp. 1298-1304.

Lin et al., "Ozone Oxidation in a Rotating Packed Bed", *J. Chem. Technology and Biotechnology*, 2003, 78:138-141.

Mathure, P. et al., "Comparison of Mass Transfer Efficiency in Horizontal Rotating Packed Beds and Rotating Biological Contactors", *J. Chem. Tech. & Biotech.*, 2005, vol. 80, Issue 4, pp. 413-419.

Schendel, R., "Improved Selective Treating Using the HIGEE Liquid-Vapor Contactor", *Fluor Engineers, Inc.*, date unknown, pp. M1-M17.

Sivalingam, G. et al., "Process Intensification in a Model Trickle-Bed Reactor", *Ind. Eng. Chem. Res.*, 2002, pp. 3139-3144.

Stankiewicz, A. et al., "Process Intensification: Transforming Chemical Engineering", *Chem. Eng. Progress*, 2000, pp. 22-34.

Tan, C. et al., "Absorption of Carbon Dioxide with Iperazine and its Mixtures in a Rotating Packed Bed", *Separation and Purification Technology*, 2006, vol. 49, Issue 2, pp. 174-180.

Trent, D. et al. "Commercial Operation of a Rotating Packed Bed (RPB) and Other Applications of RPB Technology", *Process Intensification*, 2001, pp. 11-19.

Yang, C. "The Flow Characteristics, the Mass Transfer Characteristics, and the Applications of the High Gravity Rotating Bed", *The Peking University Chemical Engineering Department*, 1991, pp. i-92.

Zheng, C. et al., "Industrial Practice of HIGRAVITEC in Water Deaeration", *Process Intensification*, 1997, pp. 273-287.

Zheng, C. et al., "Pressure Drop of Centripetal Gas Flow Through Rotating Beds", *Am. Chem. Soc.*, 2000, 6 pgs.

* cited by examiner

METHOD FOR DEGASSING A LIQUID

RELATED APPLICATIONS

This application is a continuation-in-part of U.S. patent application Ser. No. 11/541 766, filed Oct. 2. 2006 which is a continuation-in-part of U.S. patent application Ser. No. 10/971,385, now U.S. Pat. No. 7,326,283 filed Oct. 22, 2004, which claims priority from U.S. Provisional Patent Application Ser. No. 60/514,213, filed Oct. 24, 2003. The subject matter of the aforementioned applications is incorporated herein by reference in their entireties.

TECHNICAL FIELD

The present invention generally relates to a method for degassing a liquid, and more particularly to a method for degassing a liquid at sub-atmospheric pressures using rotating packed bed technology.

BACKGROUND OF THE INVENTION

Many liquids used in industrial processes contain entrained and/or dissolved gases, such as air, as a consequence of their mode of preparation or purification. Removal of these gases is frequently necessary to carry out such industrial processes satisfactorily, but this is often difficult to accomplish where ultra-low deaeration levels are desired. In the beverage packaging industry, in particular, it is essential to remove air bubbles from the water used to prepare the beverages.

The presence of dissolved oxygen in the feed water for beverage packaging lines, for example, is increasingly a concern in the beverage industry. The carbonated soft drink, high gravity beer brewing, and fruit juice packaging industries have each recognized the importance of lowering dissolved oxygen levels and achieving consistent $CO_2$ injection in order to decrease foaming, gain faster and more consistent fill rates, prolong shelf life, and produce a quality product.

SUMMARY OF THE INVENTION

In one aspect of the present invention, a method is provided for degassing a liquid. One step of the method includes providing a rotating packed bed (RPB) reactor. The RPB reactor includes a rotatable permeable element disposed within a chamber and defining an interior region, at least one liquid inlet for infusing the liquid into the interior region, at least one gas outlet for removing a gas from the interior region, and at least one liquid outlet for removing a liquid from the interior region. The rotatable permeable element within the RPB reactor is caused to spin at a tangential velocity, and the liquid is then infused into the at least one liquid inlet at an inlet flow rate. Next, a vacuum is applied to the interior region of the RPB via the at least one gas outlet to generate a liquid substantially free of the gas. For example, the amount of the gas dissolved in the liquid substantially free of the gas is about 50 $mg/m^3$ to about 900 $mg/m^3$.

In another aspect of the present invention, a method is provided for degassing water. One step of the method includes providing a rotating packed bed (RPB) reactor. The RPB reactor includes a rotatable permeable element disposed within a chamber defining an interior region, at least one liquid inlet for infusing water into the interior region, at least one gas outlet for removing a gas from the interior region, and at least one liquid outlet for removing degassed water from the interior region. The rotatable permeable element within the RPB reactor is caused to spin at a tangential velocity, and water is then infused into the at least one liquid inlet at an inlet flow rate. Next, a vacuum is applied to the interior region of the RPB via the at least one gas outlet, and a substantially degassed water is then generated.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION

Figure 1:
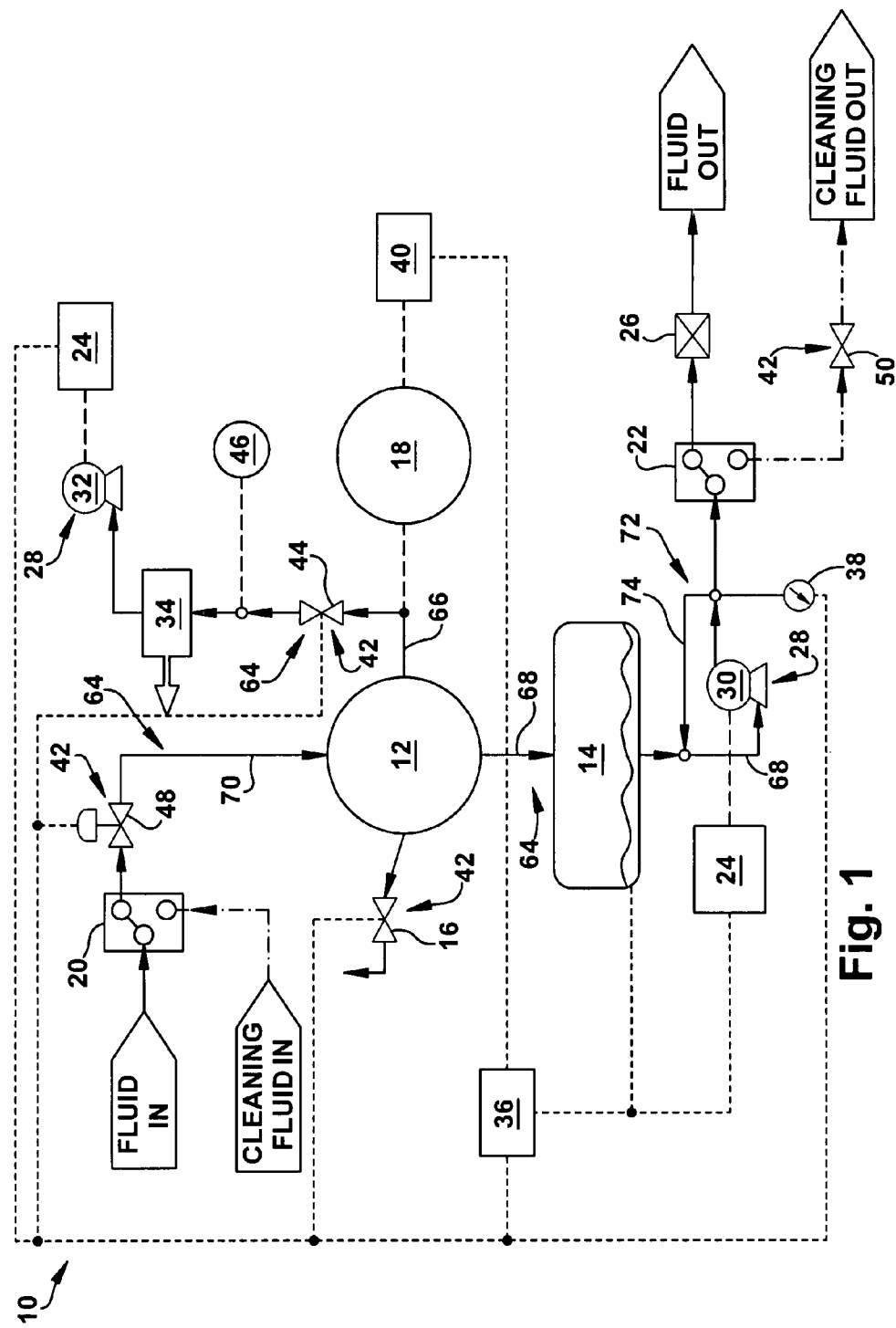
FIG. 1 is a schematic diagram showing a system for degassing a liquid constructed in accordance with the present invention.

The present invention generally relates to a method for degassing a liquid, and more particularly to a method for degassing a liquid at sub-atmospheric pressures using rotating packed bed technology.

The present invention provides, but is not limited to, a process for degassing a liquid. The term "liquid" as used herein can refer to any high or low viscosity liquid including, but not limited to, water, malt beverages, alcohol and non-alcohol beverages or liquids, and fruit juices. As used herein, the term "gas" can include any known gas having at least one atom selected from the group consisting of O, N, S, H, and C. For example, a gas according to the present invention can include air, carbon dioxide, oxygen, nitrogen, and hydrogen sulfide. The present invention is useful in the carbonated soft drink industry, the malt beverage industry, the fruit juice preparation and packaging industry, the dairy preparation and packaging industry, and in any other industry where lower dissolved oxygen levels promote consistent carbon dioxide injection to decrease foaming and lead to faster and more consistent fill rates and prolong product shelf life.

As described in more detail below, the present invention provides several advantages over prior art methods for degassing liquids. For example, the method of the present invention provides: (1) liquids having a reduced oxygen concentration of less than about 900 $mg/m^3$ at temperatures less than about 10° C.; (2) a small footprint of less than about 16 square feet; (3) a highly scalable process with a turn-down ratio of about 95%; (4) low operating pressure requirements; (5) no use of any stripping gases; (6) ability to handle acidic and caustic conditions; (7) capable of handling high temperature liquids (i.e., greater than 100° C.) for various cleaning applications; and (8) a steady state performance within seconds of operation.

The method of the present invention may be carried out within a mass transfer mixing device adapted for enhancing and optimizing the mass transfer of at least one gas from a liquid. For the purposes of the present invention, "mass transfer" refers to the transfer of a gas out of a liquid such that the resultant liquid is substantially free of the gas.

One example of a mass transfer mixing device according to the present invention is a high gravity field reactor. High gravity field reactors typically comprise a liquid or gas inlet, a gas or liquid outlet, and an inner chamber. The inner chamber may be packed with media, such as porous fillers, which are known to the skilled persons in the field. The media may be formed of, for example, foam metal or non-metal material, metal or non-metal wire mesh, porous materials such as metal balls, glass balls, ceramic members, metal oxide, or the like.

One particular example of a high gravity field reactor is a rotating packed bed (RPB) or Higee reactor. The terms "Higee" and "RPB reactor" as used herein are interchangeable and refer to devices capable of generating a high gravity field to affect mass transfer between at least two liquids and/or gases. The high gravity field is the result of a centrifugal force field generated by rotation of packed beds in the RPB or Higee reactors. The phrase "high gravity field" means that liquid and/or gas reactants are introduced into the high gravity field and react while they are moved centrifugally, or the liquid reactant is moved from the center of the RPB or Higee reactor centrifugally and the gas reactant is introduced oppositely with respect to the liquid reactant along the radial direction when the packed bed is rotating. In general, the reaction represented by the phrase "under high gravity" can be carried out in any RPB or Higee reactor or any other similar high gravity field reactor.

The centrifugal movement used to obtain the high gravity field according to the present invention can be conducted in a horizontal direction, a vertical direction, or any other arbitrary direction.

According to one embodiment of the present invention, a method is provided for degassing a liquid. The method of the present invention is carried out using a system 10 illustrated in FIG. 1. The system 10 comprises the following components: a RPB reactor 12; a holding tank 14; a vacuum vent 16; a washdown motor 18; a first transfer panel 20; a second transfer panel 22; at least one motor starter 24; a filter 26; at least one pump 28; an output pump 30; a vacuum pump 32; a knockout tank 34; a controller 36; an analyzer 38; a variable frequency drive (VFD) 40; at least one valve 42; an isolation valve 44; a vacuum pressure controller 46; a flow control valve 48; and a clean-in-place (CIP) valve 50.

Figure 2:
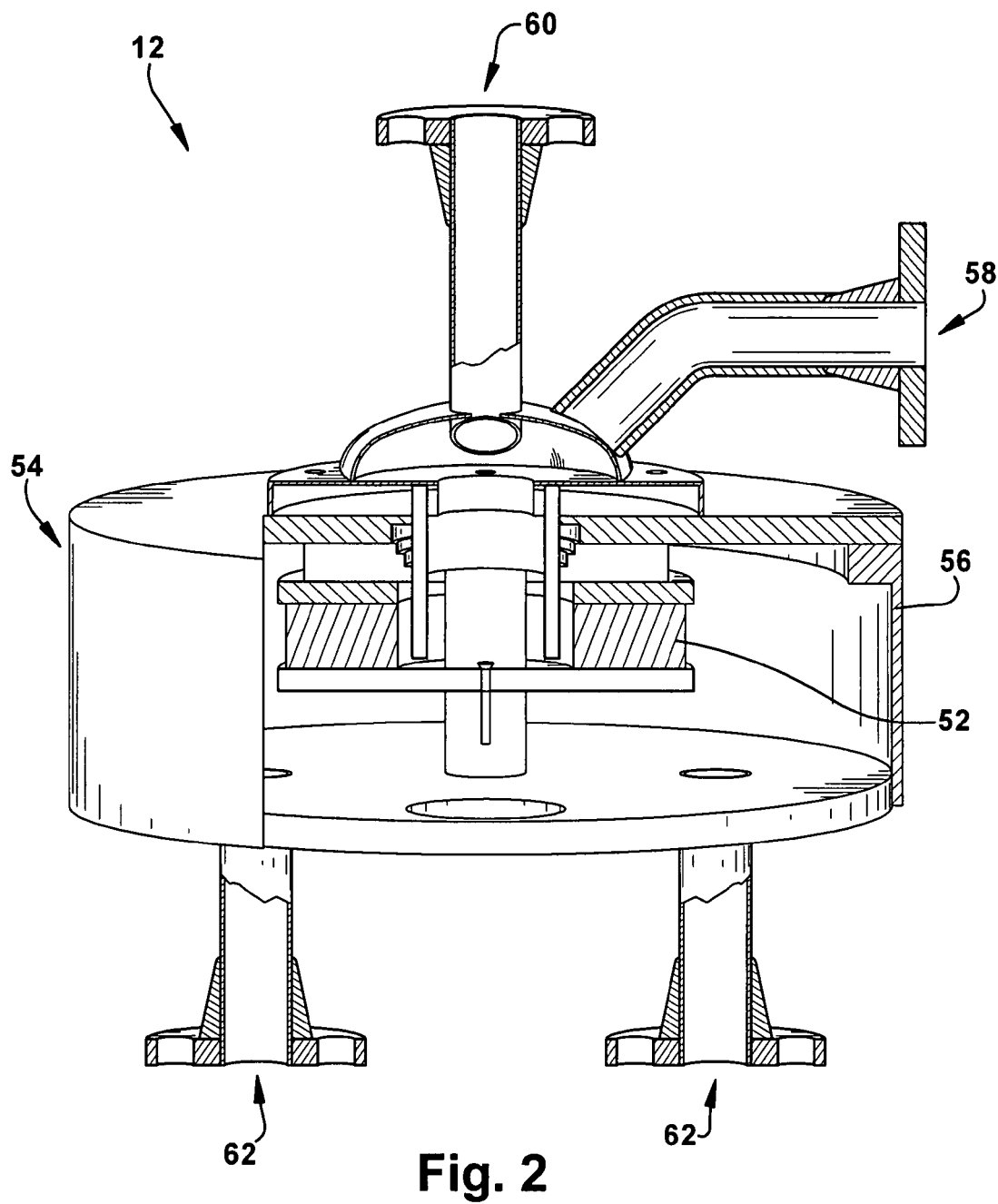
FIG. 2 is a cross-sectional view of a rotating packed bed reactor.

The RPB reactor 12 of the present invention comprises a spinning impingement multiphase contacting device shown in FIG. 2 and disclosed in U.S. Pat. No. 7,326,283 (hereinafter, "the '283 patent"), the entirety of which is incorporated herein by reference. The RPB reactor 12 comprises a rotatable permeable element 52 disposed within a chamber 54 defining an interior region 56. It is preferable, but not required, that the permeable element 32 be a porous solid, such as a foamed metal of less than about 40 pores per inch ppi, for example less than about 20 ppi, and as further example about 5-10 ppi. The RPB reactor 12 includes at least one liquid inlet 58 for introducing the liquid into the interior region 56 and at least one gas outlet 60 for removing the gas from the interior region. Additionally, the RPB reactor 12 includes at least one liquid outlet 62 for removing a liquid from the interior region 56.

Referring again to FIG. 1, the components of the present invention are assembled using an appropriate number and type of fluid lines 64. All fluid lines 64, fluid connections (not shown), and other hardware may be constructed of non-contaminating materials, such as fluoropolymers, when possible. Additionally or optionally, all fluid lines 64 may comprise corrosion-resistant materials such as hardened plastics and steel alloys (e.g., stainless steel). All fluid lines 64 couple the various components of the present invention together so that both fluids and/or gases can be flowed through the system 10 without appreciable leaking and/or pressure loss.

All the valves 42 of the present invention are operably connected to the fluid line 64 on which they are respectively situated. As a result, each valve 42 can be independently adjusted between an open position and a closed position so that liquid and/or gas flow through a respective fluid line 64 can be allowed or prohibited as desired during operation of the present invention. For example, the flow control valve 48 is responsible for regulating liquid flow into the system 10, and the isolation valve 44 protects the vacuum pump 32 during cleaning of the system. Additionally, the CIP valve 50 is responsible for regulating the output of a cleaning fluid from the system 10. The use and positioning of valves to control liquid and/or gas flow is common in the art and thus the specifics of operation and positioning will be omitted for purposes of brevity and convenience.

As shown in FIG. 1, a number of pumps 28 are coupled to the fluid lines 64 of the present invention. For example, the vacuum pump 32 (e.g., an oil re-circulating vacuum pump) is coupled to a vacuum line 66 to facilitate removal of the gas from the liquid. Additionally, the output pump 30 is coupled to an output fluid line 68 to facilitate flow of a substantially degassed liquid from the holding tank 14. The output pump 30 can comprise a centrifugal pump, examples of which are known in the art. As shown in FIG. 1, at least one motor starter 24, which is generally used to start large electrical devices, is coupled to each of the output and vacuum pumps 30 and 32.

While only two pumps 28 are illustrated for ease of illustration and to avoid clutter of the illustration, those skilled in the art will appreciate that it may be necessary to incorporate additional pumps into other areas of the system 10 at various positions. For example, a pump 28 may be supplied to an input fluid line 70 to facilitate liquid flow into the RPB reactor 12. Similarly, mass flow controllers (not shown) can be added as desired to precisely control the mass flow of a liquid throughout the system 10. Additional hardware may also include inline heaters (not shown) and/or inline chillers (not shown).

At least one analyzer 38, such as concentration and/or temperature sensor, is also included in the system 10. As shown in FIG. 1, for example, the system 10 can include an analyzer 38 operably coupled to the output fluid line 68. The analyzer 38 can be used to measure the concentration of dissolved gas in the substantially degassed liquid. The analyzer 38 may include conductivity probes (not shown) and/or light-diffraction sensors (not shown). Other types of sensors, however, can be used with the system 10 and are known in the art.

As noted, the system 10 also includes first and second transfer panels 20 and 22. As shown in FIG. 1, the first transfer 20 panel is operably connected to the input fluid line 70, and the second transfer panel 22 is operably connected to the output fluid line 68. The first and second transfer panels 20 and 22 can include a plurality of fluid input and output ports, respectively (not shown in detail). For example, the first transfer panel 20 can include a plurality of ports to facilitate input of a liquid and another port for input of a cleaning fluid. Similarly, the second transfer panel 22 can include a port for diverting a substantially degassed liquid and a cleaning fluid from the system 10. At least one filter 26, such as a 73 micron basket filter, can be operably coupled to the second transfer panel 22 to facilitate removal of particles from the substantially degassed liquid.

The system 10 further includes a properly programmed controller 36 so that the method of the present invention can be automated to carry out all functions and processes. Alternatively, the present invention may be carried out by manual control. All of the hardware and other components of the system 10, such as valves 42, pumps 28, and/or sensors may be electrically and operably coupled to the controller 36 as indicated by the dashed lines in FIG. 1.

The controller 36 is operatively coupled to the VFD 40, the motor starters 24, the isolation valve 44, the flow control valve 48, the vacuum vent 16, the holding tank 14, and the analyzer 38. The rotational velocity of the RPB reactor 12 rotor is controlled by the controller 36 via the VFD 40. Additionally, control of the flow control valve 48 is based, at least in part, on the liquid level in the holding tank 14. Depending upon whether the holding tank 14 is filling or draining, for example, the flow control valve 48 and the controller 36 can communicate with one another to modulate the liquid level in the holding tank. It will be appreciated that the controller 36 can be coupled to other components of the system 10, such as the washdown motor 18 and the vacuum pressure controller 46.

Other components of the system 10, whose operation will be described in more detail below, include the knockout tank 34 and the vacuum vent 16. The knockout tank 34, for example, is coupled to the vacuum line 66 and can protect the vacuum pump 32 from the entry of a slug of water into the vacuum portion of the system 10. The vacuum vent 16 is operably coupled to the RPB reactor 12 and assists with gas removal from the system 10.

Figure 3:
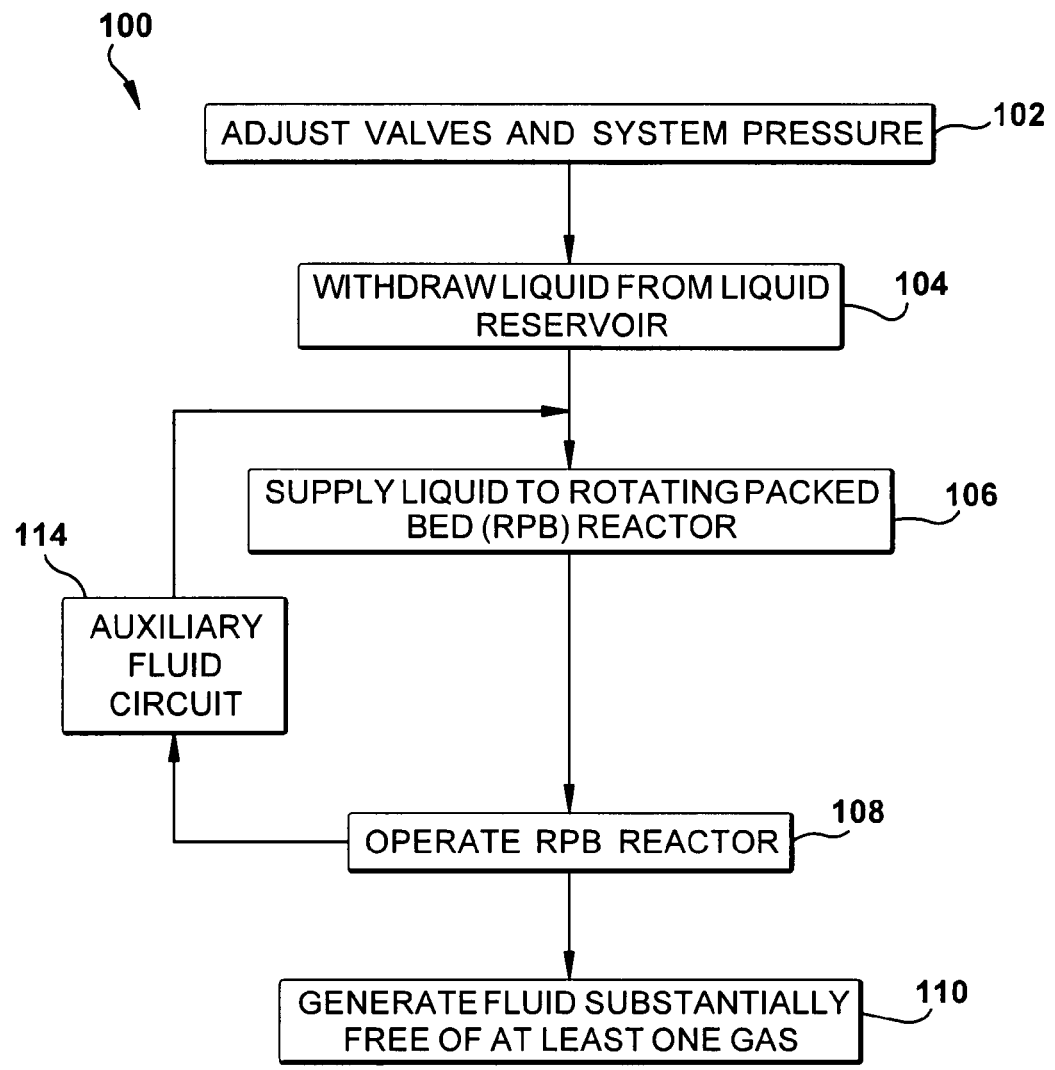
FIG. 3 is a process flowchart illustrating a process for degassing a liquid according to the present invention.

A process 100 for using the system 10 to degas a liquid in accordance with one embodiment of the present invention is illustrated in FIG. 3. For the purpose of illustration only, the process 100 of the present invention will be described in the context of removing dissolved oxygen from water. It will be appreciated, however, that the process 100 of the present invention can be used to remove any gas from a liquid.

The process 100 of the present invention begins with a step 102. In step 102, all valves 42 are in the closed position and the pumps 28 (or any other pumps) are inactive. It will be appreciated that the system pressure may be uniformly maintained or, alternatively, varied as needed. For example, the system pressure may be about 6 torr to about 50 torr and, for example, between about 18 torr and about 30 torr. The system pressure may be monitored by the vacuum pressure controller 46, which is operably connected to the vacuum line 66.

When desired, an activation signal is sent from the controller 36 to the flow control valve 48 in step 104. The activation signal can be sent to activate the regular mode or cleaning mode of the system 10. As used herein, the term "regular mode" refers to operation of the present invention to degas a liquid, and the term "cleaning mode" refers to operation of the system 10 to clean and/or sterilize the components of the present invention.

Either prior to, simultaneous with, or subsequent to opening the flow control valve 48, the motor starters 24 can be activated to start the pumps 28. Additionally, the washdown motor 18 can be started to power the RPB reactor 12. Upon activation of the pumps 28 and the washdown motor 18, water is drawn through the flow control valve 48, through the input fluid line 70, and into the liquid inlet 58 of the RPB reactor 12. The water may be delivered to the RPB reactor 12 at a desired inlet flow rate, such as about 0.5 gpm to about 2000 gpm in step 106. The temperature of the water can be about 0° C. to about 100° C. and, for example, about 8° C. to about 20° C.

After opening the flow control valve 48 and reaching a desired system pressure, the RPB reactor 12 is then operated in step 108 as described in the '283 patent, and under the particular parameters described herein. Significantly, the RPB reactor 12 maximizes the available surface area of the water for mass transfer by continuously shearing and coalescing the incoming water. For the purposes of the present invention, the tangential velocity of the rotatable permeable element 52 may be about 4 m/s to about 25 m/s. More particulany, the tangential velocity of the rotataole permeable element 52 may be about 10.7 m/s.

In step 110, the stream of water is flowed through the RPB reactor 12. The negative pressure of the system 10 (i.e., provided by the vacuum pump 32) and the increased water surface area of the water (i.e., due to the shearing action of the RPB reactor 12) promotes mass transfer of dissolved oxygen from the water into the interior region 56 of the RPB reactor. This, in turn, generates treated water that is substantially free of dissolved oxygen. After being subject to the shearing action of the RPB reactor 12, the treated water flows out of the liquid outlet 62 and into the holding tank 14.

The holding tank 14 includes a level sensor (not shown) that can monitor the treated liquid level in the tank and send a signal to the flow control valve 48. For example, when the holding tank 14 is full or nearly full, a signal may be sent from the level sensor to the flow control valve 48 to close the flow control valve and prevent further water flow through the system 10. As the treated water accumulates in the holding tank 14, the output pump 30 may then be used to flow the treated water through the second transfer panel 22 and out of the system 10 to be collected as needed.

As the treated water flows through the output fluid line 68, the dissolved oxygen concentration is measured by the analyzer 38. Depending upon the measured level of dissolved oxygen, the treated water may be re-circulated via an auxiliary fluid circuit 72 at step 114. As shown in FIG. 1, the auxiliary fluid circuit 72 can comprise a re-circulation fluid line 74 that is operably connected to the output fluid line 68 to form a loop between separate portions of the output fluid line. For example, where the dissolved oxygen concentration in the treated water is higher than desired, the treated water may be flowed through the auxiliary fluid circuit 72 until the dissolved oxygen concentration reaches a desired level.

In step 110, the water is continually supplied to the RPB reactor 12 until a desired amount of treated water is produced. As discussed above, the amount of treated water in the holding tank 14 can be monitored by the level sensor. Alternatively, mass flow controllers, load cells (not shown), or the like can be used to determine how much water is in the holding tank 14. During operation of the system 10, the controller 36 can be used to start or stop the vacuum pump 32, signal an alarm for high levels of treated water in the holding tank 14, and open or close the vacuum vent 16.

During operation of the system 10, treated water can flow through the second transfer panel 22 and into the filter 26 before exiting the system. The filter 26 can collect any particles that may be contained in the treated water. It will be appreciated that other means for filtering or treating the treated water can also be included in the system 10. For example, UV chambers (not shown) and/or activated charcoal filters (not shown) can be included in the system 10 to remove pathogens from the treated water. Once the desired amount of treated water is produced, the flow control valve 48 is closed to terminate the flow of water into the system 10.

It should be appreciated that the present invention may also include a plurality of RPB reactors 12 particularly arranged to achieve, for example, greater liquid flow rates. For instance, the present invention can include a plurality of RPB reactors 12 arranged in parallel (not shown) to handle higher liquid flow rates. Alternatively, the present invention can include a plurality of RPB reactors 12 arranged in series (not shown) to further decrease the amount of dissolved gas in a liquid using multiple passes.

The present invention permits high mass transfer efficiency at low pressure to achieve ultra-low deaeration of a liquid. A dissolved oxygen concentration of less than about 100 mg/m$^3$, for example, can be achieved under the following parameters: using the RPB reactor 12 having a rotor packing material of solid 314 stainless steel foam metal (about 200 pores/m, about 0.30 m O.D., about 0.09 m I.D., and about 0.025 m axial thickness), wherein the rotatable permeable element 52 has a tangential velocity of about 10.7 m/s; providing a liquid inlet flow rate of about 0.45 m³/h; and providing a system pressure of about 18 torr. Additional examples illustrating the ultra-low deaeration efficiency of the present invention are provided below.

The present invention is further illustrated by the following examples, which are not intended to limit the scope of potential applications of the invention.

EXAMPLES

Examples 1-8

Each of examples 1 through 8 illustrated in Table 1 was conducted with a rotor packing material of solid 314 stainless steel foam metal, about 200 pores/m, about 0.30 m O.D., about 0.09 m I.D., and about 0.025 m axial thickness. The tangential velocity at the inner diameter of the rotatable permeable element 52 was about 10.7 m/sec. The oxygen was removed from city water utilizing a vacuum pump 32 and the RPB reactor 12. The inlet and outlet water was measured for oxygen concentration using a ROSEMOUNT Model 499A TrDO dissolved oxygen analyzer 38.

In Table 1, the tangential velocity is given in column $V_T$ in m/s. The liquid inlet flow rate is given in column $F_i$ in m³/h. The oxygen inlet concentration is given in column $O_{2\ inlet\ dissolved}$ in mg $O_2$/m³ water. The oxygen outlet concentration is given in column $O_{2\ outlet\ dissolved}$ in mg $O_2$/m³ water. The system pressure is given in column $P_{system}$ in torr. The liquid temperature is given in column $T_{outlet}$ in ° C.

TABLE 1

Vacuum Deaeration of City Water

| Example | $F_i$ (m³/h) | $V_T$ (m/s) | $P_{system}$ (torr) | $T_{outlet}$ (° C.) | $O_2$ inlet dissolved (mg/m³) | $O_2$ outlet dissolved (mg/m³) |
|---|---|---|---|---|---|---|
| 1 | 0.45 | 10.7 | 18 | 8.8 | 6800 | 240 |
| 2 | 0.89 | 10.7 | 18 | 8.3 | 6700 | 235 |
| 3 | 0.45 | 10.7 | 30 | 9.2 | 6400 | 440 |
| 4 | 0.89 | 10.7 | 30 | 8.1 | 6500 | 400 |
| 5 | 0.45 | 10.7 | 18 | 16.6 | 7100 | 75 |
| 6 | 0.89 | 10.7 | 18 | 16.4 | 7100 | 100 |
| 7 | 0.45 | 10.7 | 30 | 16.5 | 7100 | 230 |
| 8 | 0.89 | 10.7 | 30 | 16.4 | 7100 | 245 |

In Examples 1-8, the outlet oxygen concentration is less than 500 mg/m³, which is considered ultra-low deaeration. In Examples 5 and 6 dissolved oxygen level is at or below 100 mg/m³. This is exceptional performance for a system 10 that utilizes no stripping gas and relies solely on vacuum as the driving force for oxygen removal.

From the above description of the invention, those skilled in the art will perceive improvements, changes and modifications. Such improvements, changes and modifications within the skill of the art are intended to be covered by the appended claims.

We claim:

1. A method for degassing a liquid, said method comprising the steps of:
   providing a rotating packed bed (RPB) reactor, the RPB reactor comprising a rotatable permeable element disposed within a chamber and defining an interior region, the rotatable permeable element, as a whole, having a porosity of less than about 40 pores per inch, at least one liquid inlet for infusing the liquid into the interior region, at least one gas outlet for removing a gas from the interior region, and at least one liquid outlet for removing a liquid from the interior region;
   causing the rotatable permeable element within the RPB reactor to spin at a tangential velocity of about 4 m/s to about 25 m/s;
   infusing the liquid into the at least one liquid inlet at an inlet flow rate;
   applying a vacuum to the interior region of the RPB reactor via the at least one gas outlet; and
   generating a liquid substantially free of the gas.

2. The method of claim 1 wherein said step of infusing the liquid into the at least one liquid inlet further comprises the steps of:
   dispersing the liquid into a highly dispersed phase; and
   continuously renewing the highly dispersed phase within the rotatable permeable element.

3. The method of claim 1 wherein said step of causing the rotatable permeable element within the RPB reactor to spin at a tangential velocity enhances dispersion of the liquid.

4. The method of claim 1 wherein said step of applying a vacuum to the interior region of the RPB reactor via the at least one gas outlet promotes mass transfer of the gas from the liquid into the interior space of the RPB.

5. The method of claim 1 wherein the inlet flow rate of the liquid is about 0.5 gpm to about 2000 gpm.

6. The method of claim 1 wherein the temperature of the liquid is about 0° C. to about 100° C.

7. The method of claim 1 wherein the RPB reactor has a system pressure of about 6 torr to about 50 torr.

8. The method of claim 1 wherein the liquid includes water.

9. The method of claim 1 wherein the gas is selected from the group consisting of air, oxygen, carbon dioxide, and nitrogen.

10. The method of claim 1 wherein the amount of the gas dissolved in the liquid substantially free of the gas is about 50 mg/m³ to about 900 mg/m³.

11. A method for degassing water, said method comprising the steps of:
    providing a rotating packed bed (RPB) reactor, the RPB reactor comprising a rotatable permeable element disposed within a chamber and defining an interior region, the rotatable permeable element, as a whole, having a porosity of less than about 40 pores per inch, at least one liquid inlet for infusing water into the interior region, at least one gas outlet for removing a gas from the interior region, and at least one liquid outlet for removing water from the interior region;
    causing the rotatable permeable element within the RPB reactor to spin at a tangential velocity of about 4 m/s to about 25 m/s;
    infusing water into the at least one liquid inlet at an inlet flow rate;
    applying a vacuum to the interior region of the RPB reactor via the at least one gas outlet; and
    generating substantially degassed water.

12. The method of claim 11 wherein said step of infusing the water into the at least one liquid inlet further comprises the steps of:
    dispersing the water into a highly dispersed phase; and
    continuously renewing the highly dispersed phase within the rotatable permeable element.

13. The method of claim 11 wherein said step of causing the rotatable permeable element within the RPB reactor to spin at a tangential velocity enhances dispersion of the water.

14. The method of claim 11 wherein said step of applying a vacuum to the interior region of the RPB reactor via the at least one gas outlet promotes mass transfer of the gas from the water into the interior space of the RPB reactor.

15. The method of claim 11 wherein the inlet flow rate of the water is about 0.5 gpm to about 2000 gpm.

16. The method of claim 11 wherein the temperature of the water is about 0° C. to about 100° C.

17. The method of claim 11 wherein the RPB reactor has a system pressure of about 6 torr to about 50 torr.

18. The method of claim 11 wherein the gas is selected from the group consisting of air, oxygen, carbon dioxide, and nitrogen.

19. The method of claim 11 wherein the amount of the gas dissolved in the substantially degassed water is about 50 mg/m$^3$ to about 900 mg/m$^3$.

* * * * *